United States Patent [19]

Bailly et al.

[11] Patent Number: 5,376,724
[45] Date of Patent: Dec. 27, 1994

[54] POLYPHENYLENE ETHER COMPOSITIONS HAVING IMPROVED FLOW

[75] Inventors: Christian M. E. Bailly, Kalmthout, Belgium; William R. Haaf, Voorheesville, N.Y.

[73] Assignee: General Electric Company, Pittsfield, Mass.

[21] Appl. No.: 179,839

[22] Filed: Jan. 10, 1994

Related U.S. Application Data

[60] Continuation of Ser. No. 922,924, Jul. 31, 1993, abandoned, which is a division of Ser. No. 407,600, Sep. 15, 1989, abandoned.

[51] Int. Cl.$^5$ ............... C08L 45/02; C08L 71/12
[52] U.S. Cl. ................... 525/132; 525/392; 525/905
[58] Field of Search ............ 525/132, 392, 905

[56] References Cited

U.S. PATENT DOCUMENTS

| | | | |
|---|---|---|---|
| 3,383,435 | 5/1968 | Cizek | 525/132 |
| 3,384,682 | 5/1968 | Erchak, Jr. et al. | |
| 4,385,146 | 5/1983 | Axelrod | 525/132 |
| 4,617,346 | 10/1986 | Sonoda | 525/68 |
| 4,684,696 | 8/1987 | Bates et al. | 525/68 |
| 4,816,515 | 3/1989 | Weiss | 525/905 |
| 4,826,919 | 5/1989 | Haaf et al. | 525/68 |
| 4,849,486 | 7/1989 | Tsuchiya et al. | 525/68 |
| 4,956,422 | 9/1990 | Falk et al. | 525/905 |
| 5,034,459 | 7/1991 | Haaf et al. | 525/68 |

*Primary Examiner*—James J. Seidleck
*Assistant Examiner*—Thomas Hamilton, III

[57] ABSTRACT

Improved thermoplastic compositions based on polyphenylene ether are disclosed. These compositions contain a resinous additive derived from a mixture which comprises aromatic monomers, such as a mixture of styrene and alpha methyl styrene. The compositions are characterized by improved melt flow, along with the substantial maintenance of other important properties, such as impact strength and heat distortion temperature.

13 Claims, No Drawings

POLYPHENYLENE ETHER COMPOSITIONS HAVING IMPROVED FLOW

This is a continuation of Ser. No. 07/922,924, filed on Jul. 31, 1993, now abandoned; which is a divisional of Ser. No. 07/407,600, filed on Sep. 15, 1989, now abandoned.

This invention relates generally to resinous compositions, and more particularly to thermoplastics containing relatively high amounts of polyphenylene ether resins.

Polyphenylene ethers (also known as PPE) are a popular class of engineering resins which exhibit a desirable combination of properties, such as hydrolytic stability, dimensional stability, toughness, heat resistance and dielectric characteristics. As used commercially, PPE is usually a constituent in a composition that contains various other components, such as impact modifiers, plasticizers, and flame retardants.

Since the favorable characteristics of these PPE-based compositions have become well-known in many areas of manufacture, new opportunities for their use have arisen. Some of these new applications call for compositions which, when molded into parts, exhibit very high heat distortion temperatures (sometimes referred to as heat deflection temperature or "HDT"), e.g., temperatures often greater than 140° C.

One means of achieving these HDT values is by increasing the proportion of PPE in the composition. However, an unfortunate consequence of this adjustment is a significant decrease in melt flow capabilities, i.e., the ability to flow freely at elevated temperatures during various resin processing stages, such as extrusion and molding.

As one would therefore expect, attempts have been made to alleviate the poor flow characteristics of compositions of this type by the use of various resins and compounds which promote flow, such as homopolystyrene and various plasticizers like the aromatic phosphates. However, the incorporation of these materials into the PPE compositions often results in a partial return to the original problem, i.e., lower heat resistance, or in the creation of new disadvantages. For example, styrene materials often decrease the HDT and impact strength of PPE-based compositions, while the volatility and migratory tendencies of some of the phosphates undesirably results in mold "plateout".

It is thus readily evident that improved PPE compositions characterized by a combination of beneficial properties are needed to meet the demands of new product applications.

SUMMARY OF THE INVENTION

The performance requirements described above have been satisfied by the discovery of the present invention: A thermoplastic composition which contains polyphenylene ether and is characterized by improved flow, impact, and heat resistance. The composition comprises:

a) at least about 70% by weight polyphenylene ether resin, based on the weight of the entire composition: and b) a resinous additive derived from a mixture which comprises aromatic monomers, said additive being present in an amount effective to increase the melt flow of the thermoplastic composition by at least about 10%, while substantially retaining the heat distortion and impact characteristics of the composition.

As described further below, the use of these additives significantly increases the melt flow of polymeric systems containing large amounts of PPE, and surprisingly, results in only minor reductions in heat deflection temperature and/or impact strength. Furthermore, these additives, being polymeric in nature, tend to remain in the compositions during processing, and therefore do not detract from the quality of finished articles, nor do they adversely affect the processing equipment.

DETAILED DESCRIPTION OF THE INVENTION

A wide variety of PPE resins may be used for component (a) of this invention. Many of them are described in U.S. Pat. Nos. 3,306,874; 3,306,875; and 3,432,469 of Allan Hay; U.S. Pat. Nos. 3,257,357 and 3,257,358 of Gelu Stamatoff; and U.S. Pat. No. 4,806,602 of Dwain M. White et al., all incorporated herein by reference. Many PPE resins are also described in two applications for B. Brown et al., Ser. Nos. 210,547 and 210,266, both filed on Jun. 23, 1988 by the assignee of the present invention and incorporated herein by reference. Both homopolymer and copolymer polyphenylene ethers are within the scope of this invention.

The preferred PPE resins are homo- and copolymers which comprise a plurality of structural units of the formula:

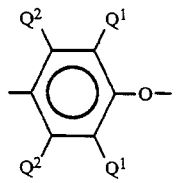

I wherein each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3-or 4-methylpentyl and the corresponding heptyl groups. Examples of secondary lower alkyl groups are isopropyl, sec-butyl and 3-pentyl. Preferably any alkyl radicals are straight chain, rather than branched. Most often, each $Q^1$ is alkyl or phenyl, especially $C_{1-4}$ alkyl, and each $Q^2$ is hydrogen.

Especially preferred polyphenylene ethers will be comprised of units derived from 2,6-dimethyl phenol. Also contemplated are PPE copolymers comprised of units derived from 2,6-dimethyl phenol and 2,3,6-trimethyl phenol.

In preferred embodiments of this invention, it is desirable that the PPE resin constitutes at least about 70% by weight of the entire composition. One reason for this preference is the requirement for high heat resistance in many of the products which may be formed from the composition. More preferred embodiments usually call for compositions which comprise at least about 80% by weight PPE resin, while the most preferred embodiments are often represented by compositions which comprise at least about 90% by weight PPE resin. Those of ordinary skill in the art will be able to select an appropriate level of PPE, based on their knowledge and on the factors described herein.

The resinous additive of component (b) is a polymerization product derived from a mixture which comprises aromatic monomers. The product is preferably of low molecular weight: less than about 7,000 (number average), as measured by gel permeation chromatography, and is therefore often referred to as being oligomeric in character.

As further described in the Examples, these resinous additives were found to be unexpectedly superior to the homopolymeric materials which are typically used to promote flow in PPE resins, such as homopolystyrene. Oligomeric resinous additives having a glass transition temperature ($T_g$) of greater than about 80° C. are preferred.

At least two classes of the mixtures used to form component (b) are suitable for this invention. The first class includes vinyl aromatic-type monomers such as styrene, para methyl styrene, alpha-methyl styrene, vinyl toluene, vinyl xylene, vinyl napthalene, indene, coumarone, and substituted variants thereof. Specific examples of these mixtures are styrene with alpha methyl styrene, wherein the polymerized product is often referred to as poly(styrene-co-alpha methyl styrene); styrene with para methyl styrene, often referred to as poly(styrene-co-para methyl styrene) after polymerization; and styrene with para methyl styrene and vinyl toluene, often referred to as styrene-p-methyl styrene-vinyl toluene terpolymer. Examples of commercial materials of this type which are presently available are the "Kristalex ®" materials such as Kristalex grades 1120 and 5140; and Endex ® materials, all available from Hercules, Inc. Some of these materials are described in a patent of W. R. Haaf et al, U.S. Pat. No. 4,826,919, the contents of which are incorporated herein by reference. Copolymers of styrene and alpha methyl styrene are especially preferred. An especially preferred material of this type is comprised of about 10 to about 90 weight percent styrene and about 90 to about 10 weight percent alpha methyl styrene (and most preferably, about 10–50 weight percent styrene and about 90–50 weight percent alpha methyl styrene), based upon the weight of the styrene and alpha methyl styrene taken together.

A second class of mixtures which may be polymerized to form the resinous additive of component (b) includes hydrocarbon compounds which are substantially aromatic in nature, i.e., containing greater than about 35% by weight aromatics, and which are often unsaturated. The mixtures often include: cycloaliphatic compounds, such as, for example, dicyclopentadiene; indenes and substituted variants thereof, such as methylene indene and methyl indene; and allyl benzene and substituted variants thereof, such as 2-propenylbenzene, methyl 2-propenylbenzene, and methylene 2-propenylbenzene. Examples of commercially available materials formed from this second class of mixtures are: Picco ® 5140, and Hercures ® A150, both available from Hercules, Inc., and Nevchem ® 150, available from Neville Chemical Corporation.

As mentioned above, component (b) is present in an amount effective to increase the flow of the resin composition by at least about 10%, while substantially retaining the heat distortion and impact characteristics of the composition. As used herein, "flow" refers to the movement of the composition through a channel mold flow orifice (5/16"×⅛") at specified molding temperatures in the range of about 338° C. to 343° C., at a pressure of about 10,000 psi.

While the term "impact characteristics" as described herein generally refers to any of the various measurements of impact strength, the Izod test is often the most useful measurement of impact strength for articles made with compositions of this invention. "Substantial retention" of the impact characteristics is therefore defined as a retention of at least about 60% of the Izod value (as compared to a control, and as tested at room temperature) while the heat distortion temperature is maintained as described below.

The heat distortion temperature (HDT) is measured herein according to ASTM D648. "Substantial retention" of the heat distortion temperature is defined as a retention of at least about 90% of the HDT value as compared to a control, i.e., a similar material without any component (b).

The effective amount of component (b) is usually about 1% by weight to about 15% by weight, based on the total weight of the composition. For many end use applications, the preferred amount of component (b) is about 3% to about 12% by weight, whereas the most preferred amount often is about 5% to about 10% by weight.

In some preferred embodiments—especially when very high HDT values and excellent flame retardance are desirable—the compositions of this invention should be free of rubber-modified alkenyl aromatic resins such as the high impact polystyrenes mentioned in U.S. Pat. No. 4,826,919. However, this is not meant to exclude the use of the styrene—ethylene butylene—styrene block copolymers described below.

In certain embodiments of this invention, processability is further enhanced by the use of effective amounts of polyoctenylene. These materials are generally well-known in the art and are described, for example, in U.S. Pat. No. 4,656,220 of Jadamus et al, the contents of which are incorporated herein by reference. They are also discussed in the pending application of Marinus Dekkers et al which corresponds to 07/406,936, filed on Sep. 13, 1989, assigned to the assignee of the present invention, and also incorporated herein by reference. A commercial example of polyoctenylene is Vestenamer ® 8012, a product of Huls.

Methods for preparing polyoctenylenes are also known in the art. As an example, these materials may be prepared by the ring-opening and/or ring-expanding polymerization of cyclooctene.

The polyoctenylenes are usually employed at a level of about 1% by weight to about 20% by weight, based on the weight of the entire composition. A more preferred level is about 2% to 10% by weight, while the most preferred level for certain embodiments is about 2.5% to about 5% by weight.

Certain types of elastomeric block copolymers can often be advantageously included as part of this invention. The preferred block copolymers are characterized by an A-B, A-B-A', or (A-B)$_m$-X structure, or mixtures of these structures, wherein A and A' are each polymerized vinyl aromatic hydrocarbon blocks, each B is derived from at least one polymerized conjugated diene, X is the radical of a multifunctional coupling agent, and m is an integer of at least 2. The block copolymers preferably contain between about 15% and 50% by weight of vinyl aromatics.

Since maximum heat stability is required under high temperature processing conditions for these compositions, it is usually preferred that the elastomeric block copolymer be almost completely hydrogenated, i.e., the average unsaturation of the copolymer should be reduced to less than about 20% of its original value. In more preferred embodiments, the average unsaturation will be reduced to less than 10%, and most preferably, less than about 5% of its original value. Methods for accomplishing the hydrogenation (which obviously affects the B block, i.e., the source of unsaturation) are known in the art.

In some preferred embodiments, A and A' are polymers independently derived from the group of monomers consisting of styrene, alpha-methyl styrene, paramethyl styrene, vinyl toluene, vinyl xylene, vinyl naphthalene, and combinations thereof; and B is obtained via post-hydrogenation of polyisoprene or polybutadiene.

Each block A and A' usually has a molecular weight in the range of about 2000 to 100,000, while each block B usually has a molecular weight in the range of about 25,000 to 1,000,000.

An especially preferred elastomeric block copolymer for this invention comprises blocks of styrene and post-hydrogenated polybutadiene, and is often referred to as "SEBS".

The preparation of elastomeric block copolymers is known in the art and can be effected, for example, by successive polymerization of the monomers in solution in the presence of a monolithium hydrocarbon initiator. Further aspects of the preparation of the elastomeric block copolymers can be found in European Patent 0,095,098, in U.S. Pat. Nos. 3,113,986, 3,431,323, 3,700,633, and 4,167,507; in German Public Disclosure 1,222,260, and in German Letters of Disclosure 2,013,263, the contents of all of these references being incorporated herein by reference.

The elastomeric block copolymer is used in an amount which enhances some of the properties of these compositions. This amount is usually about 0.5% to about 20% by weight, based on the weight of the entire composition. More preferably, the block copolymer level is in the range of about 1% to 10% by weight.

Another type of elastomeric material which is sometimes useful for this invention is a core-shell interpolymer resin, such as those described in pending application number 043,289 filed on Apr. 28, 1987 for V. Abolins et al, and incorporated herein by reference.

Preferred core-shell materials include a cross-linked acrylate rubber core, such as polybutyl acrylate. Surrounding this cross-linked core is a shell-like structure of cross-linked vinyl aromatic resin, preferably polystyrene, which surrounds and interpenetrates the cross-linked core. Incorporation of small amounts of other monomers such as acrylonitrile and/or methyl methacrylate with styrene in the shell can also provide useful products if the resulting copolymer shell does not cause significant incompatibility with the PPE matrix.

The interpenetrating network of these core-shell modifier materials is provided when the monomers forming the shell structure are polymerized and cross-linked in the presence of the previously polymerized and cross-linked polyacrylate core.

The core-shell materials generally comprise from about 40% to about 90%, by weight, of at least one cross-linked polyacrylate, and from about 10% to about 60%, by weight, of the cross-linked vinyl aromatic component, with very little graft polymerization therebetween. In preferred embodiments, the core will comprise 50% to 80% by weight cross-linked polyacrylate, based on the weight of cross-linked core and cross-linked shell taken together.

Further details regarding this general type of polymer composition can be found in U.S. Pat. No. 3,944,631, issued to A. J. Yu et al, and incorporated herein by reference. Other useful core-shell materials and methods for their preparation are taught in U.S. Pat. Nos. 4,681,915 (G. Bates, G. Chambers, and S. P. Ting), and 4,684,696 (G. Bates, W. Haaf, and S. P. Ting), both incorporated herein by reference.

The amount of core-shell material utilized is similar to the amount described for the block copolymer mentioned above, with a preferred level being about 1% to about 10% by weight, based on the weight of the entire composition. Furthermore, combinations of core-shell and block copolymer materials are possible for this invention.

Polyolefins are sometimes included in compositions of this invention. Such resins are generally known in the art and are described, for example, in the above-mentioned U.S. Pat. Nos. 4,166,055, 4,584,334, 4,383,082, in European Patent 0,095,098, in copending application S.N. 372,218, filed Jun. 23, 1989 for G. Lee, Jr. et al., in copending application S. N. 254,519 filed on Oct. 6, 1988 for G. Lee Jr., et al., and on page 836 of *The Condensed Chemical Dictionary*, Tenth Edition, Van Nostrand Reinhold Company, the entire contents of all of these references being incorporated herein by reference. The polyolefin is usually a polymer formed from an olefin of the general formula $C_nH_{2n}$. Homo- or copolymers may be s used, as well as combinations of polyolefins.

Illustrative polyolefins are polyethylene, polypropylene, polyisobutylene, copolymers of ethylene and propylene, as well as copolymers of ethylene and organic esters such as ethylene ethyl acrylate, ethylene methyl acrylate, and the like. The preparation of these polyolefins is generally well-known in the art.

The preferred polyolefins are polyethylene, polypropylene and polybutylene. Especially preferred are low density polyethylene (LDPE), linear low density polyethylene (LLDPE), medium density polethylene (MDPE), high density polyethylene (HDPE), and high impact (rubber-modified) polypropylene.

The amount of polyolefin present in the composition is usually in the range of about 0.25% to about 3% by weight, and in preferred embodiments, from about 0.5% to about 1.5% by weight, based on the total weight of the composition.

Compositions of this invention sometimes include various additives which impart a variety of attributes. Most are generally known in the art, as are their effective levels and methods of incorporation. Examples of additives are flame retardants such as aromatic phosphate compounds; plasticizers, stabilizers (e.g., oxidative, thermal, and ultraviolet light), antistatic agents, fillers, e.g., mineral fillers, reinforcing agents such as glass fiber; lubricants, colorants, dyes, pigments, drip retardants, and other processing aids.

The compositions described herein may be prepared by well-known procedures. Preferably, the ingredients are combined as a premix blend, and then melt-compounded on a single or twin screw extruder, cooled, and chopped into pellets. The pellets are then molded into articles of a desired shape and size.

Included within the scope of this invention are articles formed of the compositions described above. These articles are notable for good heat resistance, surface gloss, and impact strength—a highly desirable combination of properties for articles used in rigorous, high temperature applications.

The following examples are provided to describe various aspects of this invention. Since they are for the purpose of illustration only, they should not be regarded as limiting the invention to any of the specific materials or conditions described therein.

EXAMPLES

The PPE resin used was poly(2,4-dimethyl-1, 4-phenylene) ether, having an intrinsic viscosity of 0.40 dl/g, as measured in chloroform at 25° C.

Some of the other materials used are as follows:
Polyoctenylene: Huls Vestenamer ®, grade V8012.
Elastomeric Block Copolymer: Shell Chemical Company Kraton ® G1650, a low molecular weight triblock commonly referred to as a copolymer of styrene and ethylene-butylene (SEBS).
Polyethylene: Union Carbide Unipol ® GR8320, a linear low-density polyethylene.

The following flow promoters for component (b) were used:

| Trade Name | Manufacturer | Description |
| --- | --- | --- |
| Endex ® 160 | Hercules | Oligomeric resin derived from mixed aromatic monomers, 160° C. softening point; $T_g$ = about 109° C. |
| Picco ® 5140 | Hercules | Oligomeric resin derived from a mixture of aromatic and cycloaliphatic monomers, 140° C. softening point; $T_g$ = about 94° C. |
| Kristalex ® 5140 | Hercules | Oligomeric copolymer of styrene and alpha-methylstyrene, 140° C. softening point; $T_g$ = about 92° C. |
| Nevchem ® 150 | Neville | Similar to Picco 5140, 150° C. softening point; $T_g$ = about 98° C. |
| Hercures ® A150 | Hercules | Oligomeric aromatic-based resin, 150° C. softening point; $T_g$ = about 99° C. |
| AH738 | Huntsman | Low-Molecular Weight (Mw = ca.182,000) homopolystyrene; outside the scope of this invention; $T_g$ = about 106° C. |
| Piccolastic ® D150 | Hercules | Oligomeric (MW is less than about 7000) homopolystyrene resin, 150° C. softening point; outside the scope of this invention; $T_g$ = about 75° C. |

The compositions set forth below were dry-blended and compounded, using an extruder. The extrudate was quenched and pelletized, and the products were then molded into various test specimens. The following processing conditions were employed:

| Processing Conditions | |
| --- | --- |
| Extrusion: | 30 mm Werner-Pfleider twin-screw extruder fitted with a low-shear screw<br>Set Temps: 225° C. (feed)–315° C. (die)<br>Screw rpm: 200<br>Vent Vacuum: 25 in-Hg<br>Est'd Melt: 338° C.–343° C. |
| Molding: | 4-ounce Newbury Injection Molder<br>Set Temps: 315° C.<br>Mold Temp: 93° C.<br>Est'd Melt: 338° C.–343° C. |

The following physical tests were used on the specimens:

| Physical Property Tests | |
| --- | --- |
| FC | Flow Channel Length at 338° C. to 343° C. and 10,000 psi pressure (inches); channel flow mold of 5/16" × ⅛" |
| HDT | Heat Deflection Temperature under 66 psi fiber stress (°F.); ¼" × ½" × 5", ASTM D648 |
| IZOD | Notched Izod Impact Strength (ft-lbs/in) at room temperature (RT) and at −20° F.; ⅛" × ½" × 2½", ASTM D256 |
| DYN-Efract | Automated Falling-Dart Energy-to-Fracture (ft-lbs); ⅛" × 4" disc, ASTM D3763 |
| TYS, TE | Tensile Yield Strength (psi) and Tensile Elongation-to-Break (%); ⅛" × 8½" (⅛" × ½" gauge), ASTM D638 |
| 45° GLOSS | Surface Gloss at 45° (relative units); ⅛" × 4" disc, GE Method |
| SOFTENING POINT | ASTM-E28 Ring-and-Ball method |
| $T_g$ | Glass Transition Temperature, obtained using differential scanning calorimeter; samples exposed to programmed temperature increase of 20° C. per minute, under nitrogen. Each $T_g$ is the midpoint of the glass transition temperature range for the sample. |

The base composition for each sample (i.e., in addition to the flow promoter described in the tables) contained the following, in parts by weight:

| | |
| --- | --- |
| PPE - | 95.0 pbw |
| Vestenamer 8012 | 2.5 pbw |
| Kraton G1650 | 1.5 pbw |
| Unipol GR8320 Polyethylene | 1.0 pbw |

Tables 1, 2 and 3 set forth the results of tests performed on control samples and on samples of this invention.

TABLE 1

| PROPERTY/ CHARACTERISTIC | Sample Number | | | | |
| --- | --- | --- | --- | --- | --- |
| | 1* | 2(a) | 3(a) | 4(b)* | 5(b)* |
| Amount of Melt Flow Additive (wgt. %) | None | 5 | 10 | 5 | 10 |
| Flow Channel (inches) | 13.0 | 16.5 | 20.0 | 13.5 | 16.5 |
| HDT (264 psi)(°F.) | 378 | 366 | 351 | 370 | 358 |
| Izod Impact Strength (notched) (ft. lb/in) | | | | | |
| Room Temperature | 3.7 | 3.5 | 2.4 | 4.5 | 2.9 |
| −20° F. | 2.1 | 1.6 | 1.4 | 2.4 | 1.5 |
| Dynatup Impact Strength (ft-lbs) | | | | | |
| Room Temperature | 32 | 36 | 37 | 29 | 29 |
| −20° F. | 14 | 6 | 7 | 10 | 6 |
| Tensile Yield Strength (psi) | 10,040 | 10,550 | 11,000 | 10,170 | 10,760 |

TABLE 1-continued

| PROPERTY/ | Sample Number | | | | |
|---|---|---|---|---|---|
| CHARACTERISTIC | 1* | 2(a) | 3(a) | 4(b)* | 5(b)* |
| Tensile Elongation (%) | 46 | 36 | 18 | 27 | 19 |
| Gloss (45°) | 41 | 52 | 57 | 40 | 51 |

* = Control Samples
(a) = Endex 160, as described above.
(b) = Huntsman AH738, as described above, an additional control sample.

TABLE 2

| PROPERTY/CHARACTERISTIC | Sample Number | | | | | | |
|---|---|---|---|---|---|---|---|
| | 6* | 7(a)* | 8(a)* | 9(b) | 10(b) | 11(c) | 12(c) |
| Amount of Melt Flow Additive (wgt. %) | None | 5 | 10 | 5 | 10 | 5 | 10 |
| Flow Channel (inches) | 12.8 | 15.5 | 19.5 | 16.0 | 21.0 | 19.5 | 26.0 |
| HDT (264 psi)(°F.) | 385 | 365 | 344 | 367 | 355 | 361 | 340 |
| Izod Impact Strength (notched) (ft. lb/in) | | | | | | | |
| Room Temperature | 4.2 | 3.2 | 3.1 | 2.4 | 2.2 | 3.4 | 2.0 |
| −20° F. | 1.8 | 1.5 | 1.4 | 1.2 | 1.2 | 1.6 | 0.7 |
| Dynatup Impact Strength (ft-lbs) | | | | | | | |
| Room Temperature | 37 | 40 | 32 | 44 | 34 | 41 | 30 |
| −20° F. | 18 | 18 | 14 | 12 | 4 | 15 | 6 |
| Tensile Yield Strength (psi) | 10,130 | 10,630 | 11,030 | 10,700 | 11,010 | 10,550 | 10,980 |
| Tensile Elongation (%) | 43 | 35 | 22 | 25 | 18 | 27 | 18 |
| Gloss (45°) | 40 | 50 | 51 | 47 | 59 | 52 | 54 |

* = Control Samples
(a) = piccolastic D150, mentioned above.
(b) = Picco 5140, mentioned above.
(c) = Kristalex 5140, mentioned above.

TABLE 3

| PROPERTY/ | Sample Number | | | | |
|---|---|---|---|---|---|
| CHARACTERISTIC | 13* | 14(a) | 15(a) | 16(b) | 17(b) |
| Amount of Melt Flow Additive (wgt. %) | None | 5 | 10 | 5 | 10 |
| Flow Channel (inches) | 13.0 | 17.0 | 20.0 | 19.0 | 24.0 |
| HDT (264 psi)(°F.) | 386 | 372 | 356 | 368 | 352 |
| Izod Impact Strength (notched) (ft. lb/in) | | | | | |
| Room Temperature | 4.3 | 3.2 | 2.4 | 3.1 | 2.2 |
| −20° F. | 2.0 | 1.6 | 1.3 | 1.6 | 1.3 |
| Dynatup Impact Strength (ft-lbs) | | | | | |
| Room Temperature | 48 | 40 | 40 | 44 | 22 |
| −20° F. | 18 | 19 | 6 | 21 | 6 |
| Tensile Yield Strength (psi) | 10,090 | 10,610 | 11,010 | 10,770 | 11,340 |
| Tensile Elongation (%) | 56 | 30 | 18 | 37 | 20 |
| Gloss (45°) | 47 | 56 | 59 | 57 | 61 |

* = Control Samples
(a) = Nevchem 150, described above.
(b) = Hercures A150, described above.

In order to compare the efficiency and effectiveness of the resinous additives used in the above examples, the data in Tables 1-3 were analyzed by way of a graphical interpretation based on the following procedure:

1) For each resinous additive (i.e., component (b) of this invention), property values for the samples were plotted against the amount (%) of additive used.

2) By graphical interpolation of the flow channel value as a function of the plot for the amount of resinous additive used, i.e., the plot from step I of the procedure, the concentration of a particular additive necessary to produce a selected degree of flow improvement (versus control samples having no additive) was identified.

3) Using the concentration of the particular resinous additive established in step 2, along with other property value plots obtained from step 1, the property values corresponding to the selected degree of flow improvement were determined.

The property values obtained from this procedure are set forth in Tables 4 and 5, thereby enabling one to compare the various flow promoters, based on iso-flow conditions for either a 25% or 50% improvement in flow.

TABLE 4

| PROPERTY/CHARACTERISTIC | Sample Number | | | | | | | | | |
|---|---|---|---|---|---|---|---|---|---|---|
| | 18* | 19(a) | 20(b)* | 21* | 22(c) | 23(d) | 24(e)* | 25* | 26(f) | 27(g) |
| Percent (%) concentration required for 25% flow channel increase, versus control | — | 4.6 | 9.7 | — | 5.0 | 2.4 | 5.7 | — | 3.9 | 2.6 |
| Flow Channel (inches) | 13.0 | 16.25 | 16.25 | 12.8 | 16.0 | 16.0 | 16.0 | 13.0 | 16.25 | 16.25 |
| HDT (264 psi)(°F.) | 378 | 367 | 359 | 385 | 367 | 374 | 362 | 386 | 375 | 377 |
| Izod Impact Strength (notched) (ft. lb/in) | | | | | | | | | | |
| Room Temperature | 3.7 | 3.5 | 3.0 | 4.2 | 2.4 | 3.9 | 3.2 | 4.3 | 3.4 | 3.6 |
| −20° F. | 2.1 | 1.6 | 1.5 | 1.8 | 1.2 | 2.2 | 2.0 | 2.0 | 1.7 | 1.8 |
| Dynatup Impact Strength (ft-lbs) | | | | | | | | | | |

TABLE 4-continued

| PROPERTY/CHARACTERISTIC | Sample Number | | | | | | | | | |
|---|---|---|---|---|---|---|---|---|---|---|
| | 18* | 19[a] | 20[b]* | 21* | 22[c] | 23[d] | 24[e]* | 25* | 26[f] | 27[g] |
| Room Temperature | 32 | 36 | 29 | 37 | 44 | 39 | 40 | 48 | 42 | 46 |
| −20° F. | 14 | 7 | 6 | 18 | 12 | 17 | 17 | 18 | 19 | 19 |

\* = Control Samples
[a] = Endex 160
[b] = AH 738
[c] = Picco 5140
[d] = Kristalex 5140
[e] = Piccolastic D150
[f] = Nevchem 150
[g] = Hercures A150

TABLE 5

| PROPERTY/CHARACTERISTIC | Sample Number | | | | | | | | | |
|---|---|---|---|---|---|---|---|---|---|---|
| | 18* | 19[a] | 20[b]* | 21* | 22[c] | 23[d] | 24[e]* | 25* | 26[f] | 27[g] |
| Percent (%) concentration required for 50% flow channel increase, versus control | — | 9.3 | 13.5** | — | 8.2 | 4.9 | 9.7 | — | 10.0 | 5.4 |
| Flow Channel (inches) | 13.0 | 19.5 | 19.5 | 12.8 | 19.2 | 19.2 | 19.2 | 13.0 | 19.5 | 19.5 |
| HDT (264 psi)(°F.) | 378 | 354 | 348 | 385 | 358 | 361 | 346 | 386 | 356 | 366 |
| Izod Impact Strength (notched) (ft. lb/in) | | | | | | | | | | |
| Room Temperature | 3.7 | 2.6 | 1.8 | 4.2 | 2.3 | 3.4 | 3.1 | 4.3 | 2.4 | 3.0 |
| −20° F. | 2.1 | 1.4 | 0.9 | 1.8 | 1.2 | 2.1 | 1.9 | 2.0 | 1.3 | 1.6 |
| Dynatup Impact Strength (ft-lbs) | | | | | | | | | | |
| Room Temperature | 32 | 37 | 29 | 37 | 38 | 41 | 33 | 48 | 40 | 44 |
| −20° F. | 14 | 7 | 3 | 18 | 7 | 15 | 14 | 18 | 6 | 20 |

\* = Control Samples
[a] = Endex 160
[b] = AH 738
[c] = Picco 5140
\*\* = Extrapolated Value
[d] = Kristalex 5140
[e] = Piccolastic D150
[f] = Nevchem 150
[g] = Hercures A150

The data from Tables 4 and 5 demonstrate distinct and unexpected advantages of compositions of the present invention. For example, it is clear from Table 5 that samples which contain the resinous flow promoters of this invention (i.e., samples 19, 22, 23, 26 and 27) require considerably less flow promoter than samples which contain the conventional low molecular weight homopolystyrene (i.e., sample 20). Furthermore, HDT and Izod Impact Strength values are also improved.

Data from Table 5 also demonstrate that, while the impact strength values for oligomeric homopolystyrene materials sometimes used in the prior art (i.e., sample 24) are reasonably good, samples of this invention are considerably better in terms of HDT retention.

In summary, compositions according to the present invention exhibit very distinct improvements over the prior art in terms of combinations of properties, e.g., very good melt flow and efficient use of melt flow additives, along with good impact strength and HDT retention.

Based on the above description, it will be apparent to those of skill in the art that various modifications of this invention can be made without departing from the spirit or scope thereof.

We claim:

1. A thermoplastic composition, comprising:
   (a) polyphenylene ether resin; and
   b) a resinous additive derived from a mixture which comprises aromatic monomers, said additive being present in an amount effective to increase the melt flow of the thermoplastic composition by at least about 10%, while substantially retaining the heat distortion and impact characteristics of the composition, wherein said resinous additive comprises at least one of components (i) and (ii) wherein said component (i) is selected from the group consisting of vinyl toluene, vinyl xylene, vinyl naphthalene, indene, coumarone, and substituted variance thereof, and said component (ii) comprises hydrocarbon compounds which are substantially aromatic in nature.

2. The composition of claim 1 wherein the resinous additive of component (b) is a polymerization product having a molecular weight of less than about 7000.

3. The composition of claim 1, wherein the resinous additive is an oligomer having a glass transition temperature of greater than about 80° C.

4. The composition of claim 3 wherein the resinous additive is derived from a mixture of oligomeric hydrocarbon compounds which are substantially aromatic in nature.

5. The composition of claim 4 wherein the mixture includes cycloaliphatic compounds.

6. The thermoplastic composition according to claim 1, wherein said resinous additive comprises an oligomeric resinous additive having a glass transition temperature of greater than about 80° C.

7. The thermoplastic composition according to claim 1, wherein said component (ii) comprises at least one selected from cycloaliphatic compounds, indenes and substituted variants thereof, and allyl benzene and substituted variants thereof.

8. The thermoplastic composition according to claim 7, wherein said component (ii) comprises at least one selected from dicyclopentadiene, methylene indene, methyl indene, 2-propenylbenzene, methyl 2-propenylbenzene, and methylene 2-propenylbenzene.

9. The thermoplastic composition according to claim 6, wherein said composition is substantially free of rubber-modified alkenyl aromatic resin.

10. The thermoplastic composition of claim 6, wherein said component (b) is present in an amount of about 1% by weight to about 15% by weight, based on the weight of the entire composition.

11. The thermoplastic composition according to claim 10, wherein said component (b) is present in an amount of from about 3% by weight to about 12% by weight based on the weight of the entire composition.

12. The thermoplastic composition according to claim 11, wherein said component (b) is present in an mount of about 5% by weight to about 10% by weight, based on the weight of the entire composition.

13. A thermoplastic composition, comprising:
(a) at least about 90% by weight polyphenylene ether resin, based on the weight of the entire composition; and
(b) a resinous additive derived from a mixture which comprises aromatic monomers, said additive being present in an amount effective to increase the melt flow of the thermoplastic composition by at least about 10%, while substantially retaining the heat distortion and impact characteristics of the composition.

* * * * *